(12) United States Patent
Ashley et al.

(10) Patent No.: US 11,507,943 B1
(45) Date of Patent: Nov. 22, 2022

(54) DIGITAL WALLET FOR DIGITAL IDENTITIES AND INTERACTIONS WITH A DIGITAL IDENTITY SERVICES PLATFORM

(71) Applicant: Anonyome Labs, Inc., Draper, UT (US)

(72) Inventors: Paul Ashley, Toowong (AU); Steven Harvey McCown, Mapleton, UT (US); Simon Gee, Varsity Lakes (AU); John David Mumford, Portola Valley, CA (US); Greg Clark, San Francisco, CA (US)

(73) Assignee: Anonyome Labs, Inc., Salt Lake City, UT (US)

( * ) Notice: Subject to any disclaimer, the term of this patent is extended or adjusted under 35 U.S.C. 154(b) by 328 days.

(21) Appl. No.: 16/821,181

(22) Filed: Mar. 17, 2020

Related U.S. Application Data

(60) Provisional application No. 62/980,023, filed on Feb. 21, 2020.

(51) Int. Cl.
| | |
|---|---|
| *G06Q 20/36* | (2012.01) |
| *H04L 9/06* | (2006.01) |
| *H04L 9/40* | (2022.01) |
| *H04L 9/00* | (2022.01) |

(52) U.S. Cl.
CPC ......... *G06Q 20/363* (2013.01); *H04L 9/0637* (2013.01); *H04L 63/08* (2013.01); *H04L 9/50* (2022.05); *H04L 2209/56* (2013.01)

(58) Field of Classification Search
CPC ..... G06Q 20/363; H04L 9/0637; H04L 63/08; H04L 2209/56; H04L 9/50

USPC .......................................................... 705/76
See application file for complete search history.

(56) References Cited

U.S. PATENT DOCUMENTS

| | | | |
|---|---|---|---|
| 11,233,647 B1 * | 1/2022 | Fontaine | H04L 9/3215 |
| 11,251,977 B2 * | 2/2022 | Murdoch | G06F 21/64 |
| 11,329,968 B2 * | 5/2022 | Buchner | H04L 9/50 |
| 11,343,074 B2 * | 5/2022 | Kamm | H04L 9/3263 |
| 2021/0256508 A1 * | 8/2021 | Moy | G06Q 20/363 |

FOREIGN PATENT DOCUMENTS

WO    WO-2019072823 A1 *   4/2019   ......... G06F 21/6209

OTHER PUBLICATIONS

El Haddouti et al. ("Analysis of Identity Management Systems Using Blockchain Technology", 2019 International Conference on Advanced Communication Technologies and Networking (CommNet); Mar. 22, 2019, 7 pages) (Year: 2019).*

(Continued)

*Primary Examiner* — James D Nigh
(74) *Attorney, Agent, or Firm* — Cooley LLP

(57) ABSTRACT

A non-transitory computer readable storage medium has instructions executed by a processor to maintain a digital wallet with digital identities. Each digital identity has identity attributes different than identity attributes associated with a real individual utilizing the digital identity, an associated attribute for compartmentalized network activity, a digital identity key pair, and a designated block chain. Interactions between the digital identities of the digital wallet and a digital identity services platform are supported.

11 Claims, 14 Drawing Sheets

(56) References Cited

OTHER PUBLICATIONS

Gulati et al. ("Self-Sovereign Dynamic Digital Identities based on Blockchain Technology", 2019 SoutheastCon, Feb. 28, 2020, 6 pages) (Year: 2020).*

Moreno et al. ("The OLYMPUS Architecture—Oblivious Identity Management for Private User-Friendly Services", Sensors 2020, 20, 945; doi:10.3390/s20030945, www.mdpi.com/journal/sensors, Feb. 10, 2020, 23 pages) (Year: 2020).*

* cited by examiner

Wallet Management Rules

○ Legal Identity Persona
Connections (DIDs)   ☐ Accept   ☒ Share
Verifiable Claims    ☐ Accept   ☒ Share
Web Logins           ☐ Accept   ☒ Share
Secret Values        ☐ Accept   ☒ Share ● Work Identity Persona
Connections (DIDs)   ☒ Accept   ☐ Share
Verifiable Claims    ☒ Accept   ☐ Share
Web Logins           ☒ Accept   ☐ Share
Secret Values        ☒ Accept   ☐ Share ● Social Media Persona
Connections (DIDs)   ☐ Accept   ☐ Share
Verifiable Claims    ☐ Accept   ☐ Share
Web Logins           ☐ Accept   ☐ Share
Secret Values        ☐ Accept   ☐ Share ● Home Identity Persona
Connections (DIDs)   ☐ Accept   ☒ Share
Verifiable Claims    ☐ Accept   ☒ Share
Web Logins           ☐ Accept   ☒ Share
Secret Values        ☐ Accept   ☒ Share ○ Shopping Identity Persona
Connections (DIDs)   ☒ Accept   ☒ Share
Verifiable Claims    ☒ Accept   ☒ Share
Web Logins           ☒ Accept   ☒ Share
Secret Values        ☒ Accept   ☒ Share

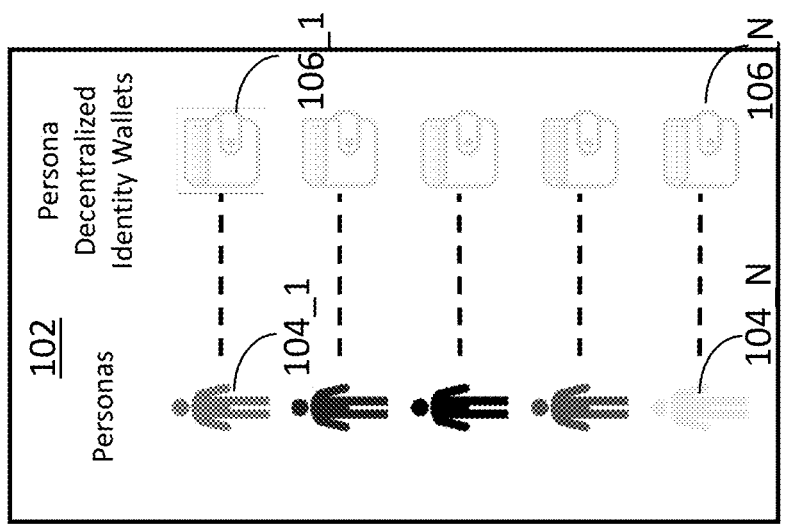

Figure 9

DIGITAL WALLET FOR DIGITAL IDENTITIES AND INTERACTIONS WITH A DIGITAL IDENTITY SERVICES PLATFORM

CROSS-REFERENCE TO RELATED APPLICATION

This application claims priority to U.S. Provisional Patent Application Ser. No. 62/980,023, filed Feb. 21, 2020, the contents of which are incorporated herein by reference.

FIELD OF THE INVENTION

This invention relates generally to digital communications in computer networks. More particularly, the invention is directed to a digital wallet for digital identities and interactions with a digital identity services platform.

BACKGROUND OF THE INVENTION

With the current state of identity theft, uncontrolled data collection of PII (personally identifiable information) and targeted marketing, there is a need for users to consider how to protect their PII when online.

One very important aspect to consider is identity management. The first identity management model implemented on the Internet, which is referred to as a centralized identity management model, requires a user to create a new account on a web site or service. The user typically creates a username and password and provides some subset of PII. The problem for the user in using this model is that the PII is distributed to numerous services across the Internet (usually hundreds) and is open to analysis, correlation, sale and theft. The end result for the user is lost privacy, potential identity and financial theft, and subsequent targeting by email and messaging spam.

The second identity management model, which is commonly referred to as federated identity management model or social login, requires a user to create an account on a large provider (e.g., Google®, Facebook®, LinkedIn®, or Apple®), and then use this account to login to a new web site or service. The advantage of this second model is simplification for the user as the user does not have to create and manage separate accounts on every web site and service used. The downside is that the user is giving to these large providers not only PII, but also detailed behavioral information of interactions across the Internet. This system can therefore be even more detrimental to the user's privacy than the centralized model.

A new model called decentralized identity has been designed to overcome the privacy deficiencies of centralized and federated identity management models. Leveraging blockchain and/or distributed ledger technology, decentralized identity is a system that emphasizes attributes or relationships over identifiers (e.g., usernames and passwords). In contrast with conventional identification systems, a decentralized identity isn't created by an internet-based service or an organization and given to a user, but rather it is created by a user (as a decentralized identity) and is then voluntarily provided to a service where the user chooses to interact. When a user provides decentralized identity to a service, the service responds by creating a cryptographic credential for the user. The user stores this credential in a wallet and the service stores the corresponding values in its wallet. These cryptographic processes are transparent to the user, and the net result is that the user and the service will have exchanged values that can be used for subsequent authentication and encrypted communications. Among other things, this mechanism lets the user login to the service without having to use (or remember) a cumbersome (and much less secure) password. The benefit of the decentralized identity model over centralized and federated models is that the user remains in complete control of identity, including being able to prove some characteristic (e.g., over age 18), without actually disclosing actual personal data (i.e., birthdate).

Although the decentralized identity model is a step forward in providing privacy for the user, there are still some privacy limitations. The first is that it is premised on the user having a single principal identity (a legal identity). Each user creates a single decentralized identifier (DID) for that principal identity on a blockchain, and that is the anchor point for that user. Each new relationship that is set up from that point is based on this principal identity, therefore creating a fingerprint of the user. Depending on the technology implementations that service providers use to deliver their legal identity services, it can allow data brokers to correlate the user's relationships between services, potentially enabling the tracking of the user.

A second limitation is that the user may need to have a decentralized identity created by a number of different service providers that each anchor on different blockchains. For example, the user, for work purposes, may need to have a decentralized identity on an enterprise focused blockchain (e.g., Microsoft iON), and for government interactions, the user may need to have a decentralized identity on a blockchain supporting government related use cases (e.g., Sovrin). This will require the user to obtain multiple decentralized identity supporting applications each managing the user's decentralized identity on a particular blockchain.

The third limitation of decentralized identity occurs when a user is accessing an online service, such as when purchasing from an online merchant. Although the user can establish a private connection with that service (e.g., passwordless login) and provide identity proofs so as not to disclose sensitive PII, the user will still need to provide some personal data for transaction purposes. For example, the user may need to provide a personal email address, personal phone number, personal credit card number, and personal shipping address for interactions during purchasing. All of these are identifiers that can be linked to the user and used for correlation and tracking, including correlation to a principal identity on a blockchain.

Finally, the use of the principal identity for all interactions means that the decentralized identity wallet (that holds key pairs, principal DID, pairwise DIDs, verifiable credentials and other data) will become difficult to manage in time, as all interactions (connections) are managed within the same wallet. As the number of items in the wallet grows (potentially hundreds of items), it will become increasingly unmanageable for the user.

What is needed is a new solution that builds on the key concepts of decentralized identity and provides additional privacy protection and improved manageability for the user.

SUMMARY OF THE INVENTION

A non-transitory computer readable storage medium has instructions executed by a processor to maintain a digital wallet with digital identities. Each digital identity has identity attributes different than identity attributes associated with a real individual utilizing the digital identity, an associated attribute for compartmentalized network activity, a digital identity key pair, and a designated block chain.

Interactions between the digital identities of the digital wallet and a digital identity services platform are supported.

BRIEF DESCRIPTION OF THE FIGURES

The invention is more fully appreciated in connection with the following detailed description taken in conjunction with the accompanying drawings, in which:

FIG. 9 illustrates management rules for different compartmentalized persona attributes.

Like reference numerals refer to corresponding parts throughout the several views of the drawings.

DETAILED DESCRIPTION OF THE INVENTION

A new system combines the concept of digital personas with decentralized identity. Instead of the user having one principal identity in which to anchor all of interactions, the user is able to create a number of fully functioning digital personas each with its own principal decentralized identity. Each digital persona decentralized identity can be used as the anchor point for interactions associated with that persona, including on different blockchains. In addition, the use of the digital personas with capabilities (e.g., telephony, email, messaging, virtual cards, compartmentalized browser, etc.) allows the user to have a full range of privacy protections complementing those provided by decentralized identity.

Figure 1A:
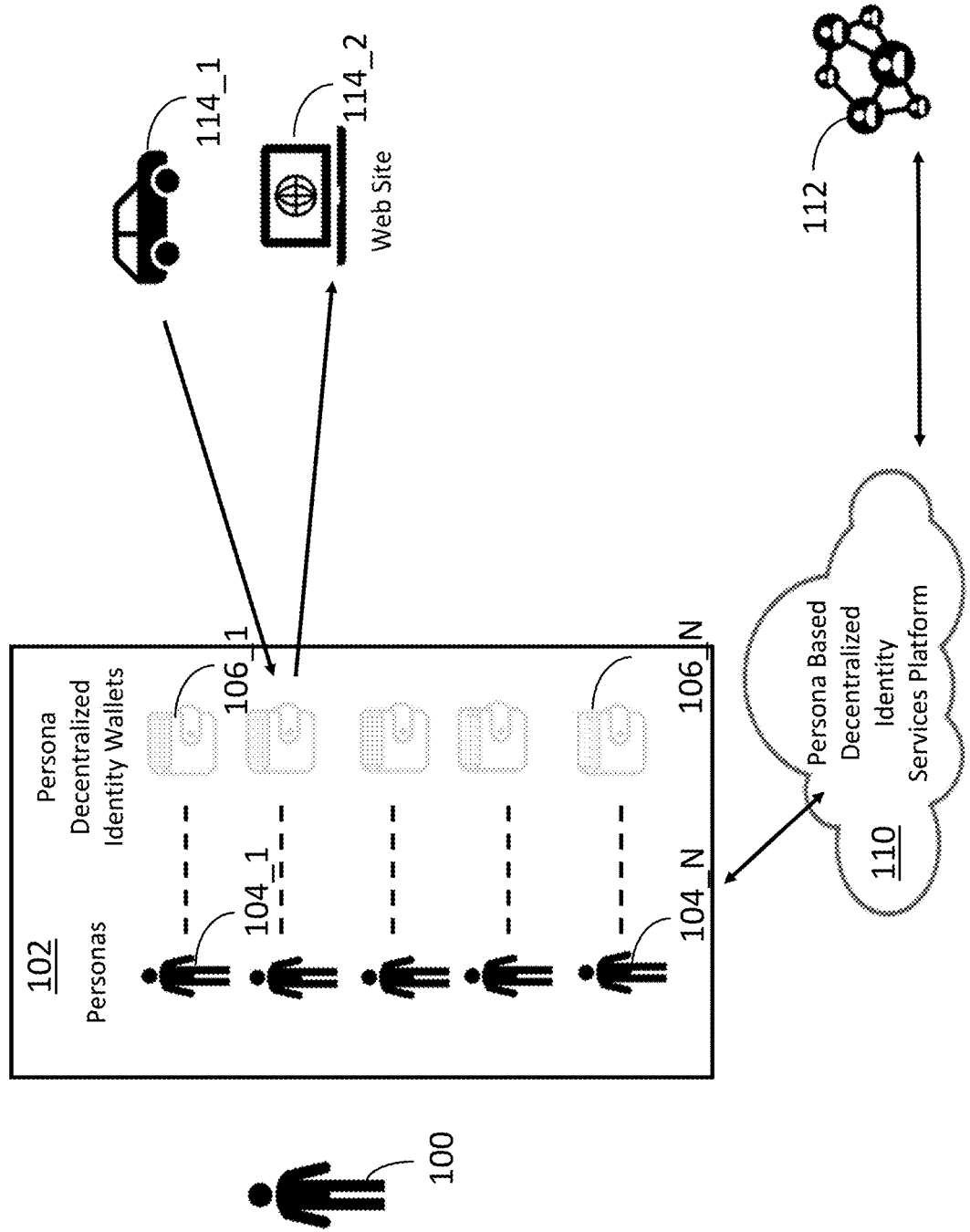
FIG. 1A illustrates elements associated with an embodiment of the invention.

FIG. 1A gives an overview of the Persona-Based Decentralized Identity System. A user 100 has a digital wallet 102 operative as a Multiple Persona Enabled Management Application. An example of an application that provides a user with multiple personas is MySudo™ from Anonyome Labs, Salt Lake City, Utah. This application allows the user to compartmentalize activities (e.g., communications, browsing, purchasing, etc.) using a variety of situational activity-based personas 104_1 through 104_N. The user can create multiple personas (e.g., one for work, one for selling and one for social interactions). Each of these personas is enhanced with its own decentralized identity (DID) and each persona also has its own decentralized identity wallet 106_1 through 106_N. This allows the user to leverage the same compartmentalization and separation for decentralized identity as would be provided to other persona-based services.

The digital wallet 102 interacts with a Persona-Based Decentralized Identity Services Platform 110. This system provides a way for the Persona Management Application to interact (write/read/search) with multiple decentralized identity platforms, such as: Sovrin (Hyperledger Indy), uPort (Ethereum), Ion (Bitcoin). The user therefore may have one persona's decentralized identity on one decentralized identity ledger 112 (e.g., Sovrin), and another persona might have its decentralized identity on a different decentralized identity ledger, such as uPort. This allows the user to interact with various decentralized identity blockchains that are in production today providing true separation and compartmentalization of identity attributes. Similarly, the platform allows the Persona Management Application to interact with multiple identity hubs (e.g., Microsoft Azure Identity Hub).

FIG. 1A also shows a credential issuer 114_1 (e.g., a government transport department) and a credential verifier 114_2 (e.g., a proof of age verifier web site). One of the core concepts is that once a user has a decentralized identity, that user may then request a verifiable credential (with claims) from a credential issuer 114_1 and present the credentials (as proofs) to a credential verifier 114_2. In this case, the credential is being issued to one of the user's personas and is stored in the persona's wallet. This compartmentalization helps with management and separation of the decentralized identities and their verifiable credentials.

Figure 1B:
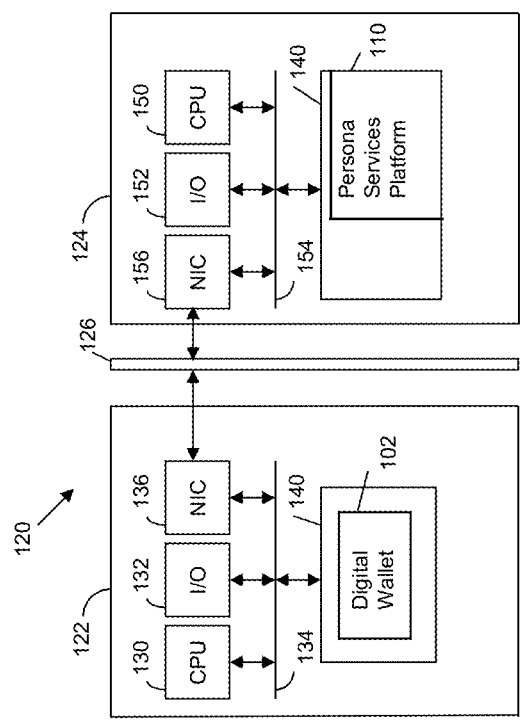
FIG. 1B illustrates a system configured in accordance with an embodiment of the invention.

FIG. 1B illustrates a system 120 configured in accordance with an embodiment of the invention. The system 120 includes a client machine 122 in communication with a server 124 via a network 126, which may be any combination of wired or wireless networks. Client machine 122 includes a processor (e.g., central processing unit 130) connected to input/output devices 132 via a bus 134. A network interface circuit 136 is also connected to the bus 134 to provide connectivity to network 126. A memory 140 is also connected to the bus 134. The memory 140 stores a digital wallet 102 with instructions executed by processor 130 to implement operations disclosed herein.

Server 124 includes a processor 150, input/output devices 152, a bus 154 and a network interface circuit 156. A memory 140 is connected to bus 154. The memory 140 stores a persona services platform 110 with instructions executed by processor 150 to implement operations disclosed herein. A credential issuer machine and a credential verifier machine may also be connected to network 126.

A key privacy concept is the use of digital personas for compartmentalization or grouping of service interactions. Rather than a user performing all service interactions with the one identity, the invention is that the user will create multiple digital personas and use them for different purposes. Each persona has its own unique identity attributes that may include name, handle, phone number, email address, virtual credit cards, virtual private network (VPN) configuration, browser state, log-in credentials, and shipping address. Each persona should be used for a limited and specific purpose. Consequently, any tracking done on an individual user persona would not form a complete picture of the user's activity, since they will operate using various personas. The personas act as a personal privacy proxy, not allowing people and online services direct access to the user's personal identity.

Personas can help the user in a number of ways. Not only do personas assist in protecting the privacy of the user but they also assist in the management of the user's online and offline interactions. Using separate activity-based personas will naturally compartmentalize the user's various interactions by grouping them in a manageable way, such as: work persona, selling persona, web searching persona, shopping persona, etc. For example, the user may have a work-related social account (e.g., Twitter®), and a personal related social account on the same platform. Separating the social account information and communication by personas (e.g., work and social personas), helps the user to manage these two interactions and to keep them completely separate. Another advantage of the digital personas is that they can be temporary, such as a persona established for a particular relationship or transaction and can then be deleted when it is no longer needed.

One limitation that exists today with decentralized identity is that it does not naturally lend itself to compartmentalization through personas. The assumption in the decentralized identity community is that the user has a single decentralized identity (a principal identity), a single decentralized identity wallet and uses it for all interactions. Using the example of Twitter accounts above, each of the user's Twitter decentralized identity enabled accounts would be anchored on the same decentralized identity and use the same decentralized identity wallet. The user is therefore mixing similar accounts with the same identity (but for completely different purposes) and is not being afforded the compartmentalization and separation benefits previously described. Using the same identity for multiple services can actually result in more tracking, not less.

Figure 2:
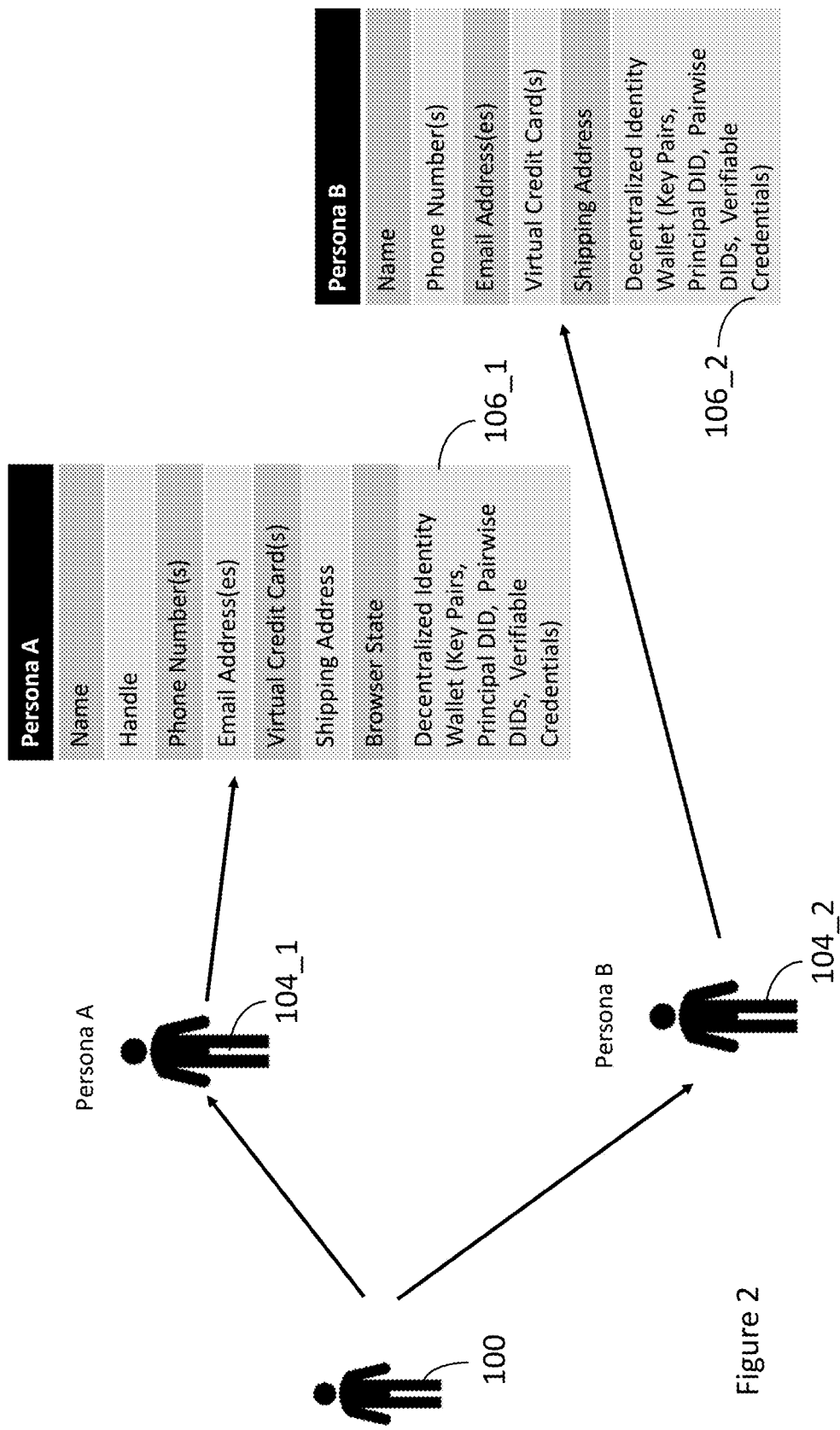
FIG. 2 illustrates digital identity details associated with different personas.

To enable the user to manage and compartmentalize online relationships better, to provide greater privacy protection, the user could benefit from being able to combine the two concepts of personas and decentralized identity. FIG. 2 shows this concept. User 100 is shown with two personas 104_1 and 104_2. Each of the user's personas has been enhanced by having its own Decentralized Identity wallet, respectively 106_1 and 106_2, for storing of the persona's cryptographic keys pairs, the persona's principal DID, derived pairwise DIDs, verifiable credentials and other items. By attaching the decentralized identity to the persona in this way, the user gets all of the same persona compartmentalization benefits when using decentralized identity.

Figure 3:
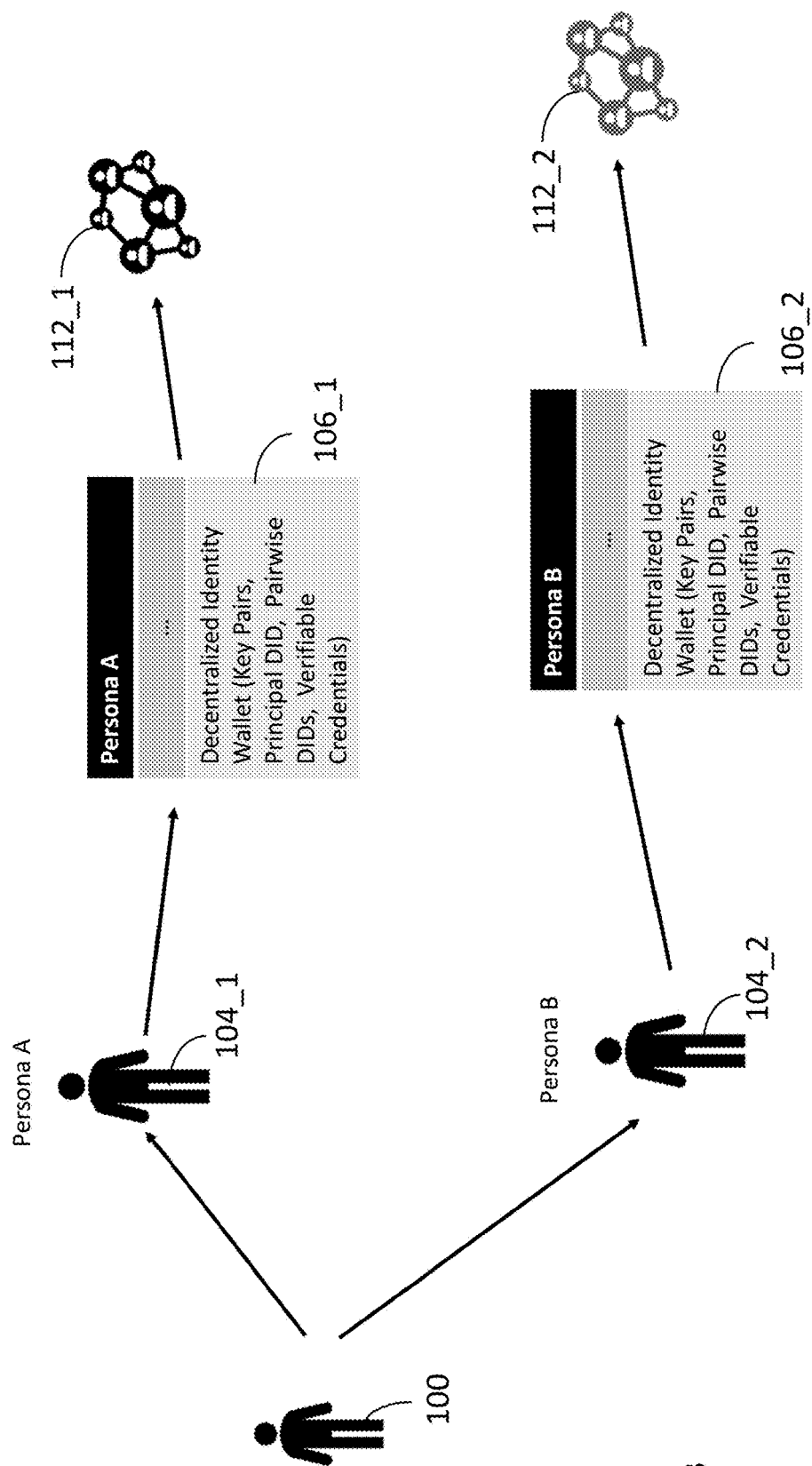
FIG. 3 illustrates different block chains associated with different personas.

As shown in FIG. 3, this in turn naturally provides the foundations for storing different persona decentralized identities on different blockchains, such as 112_1 and 112_2. One of the key concepts of this new approach is to establish separate decentralized identities for each of the user's personas. These decentralized identities may even be on completely different blockchains. They are the principal identity for that persona and are therefore used for each decentralized identity interaction of the persona. For example, the user could use this persona-based decentralized identity to login to a web site, accept a verifiable credential from a government issuer, present a verifiable credential proof to a validator, and so on.

Figure 4:
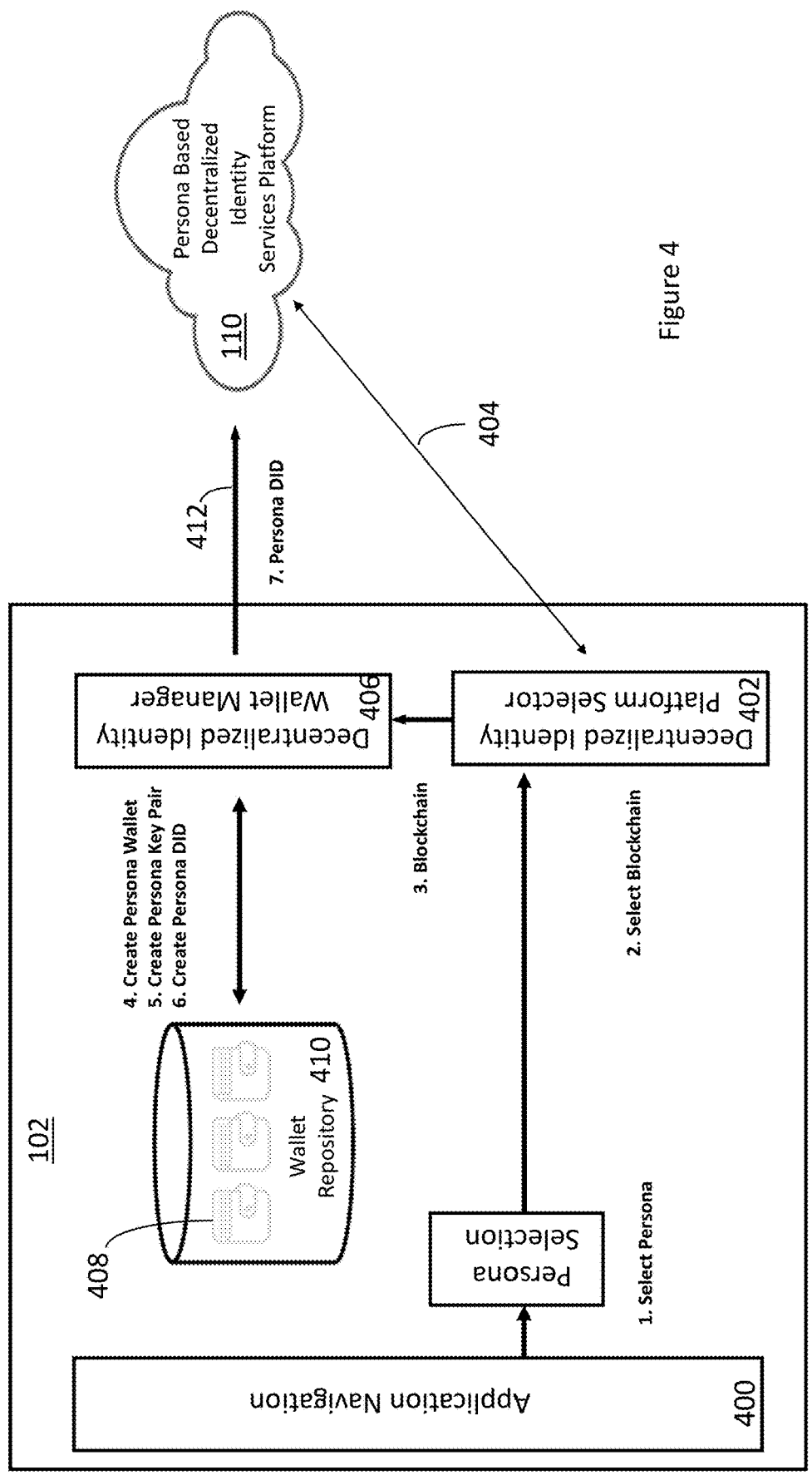
FIG. 4 illustrates operations performed by a digital wallet in accordance with an embodiment of the invention.

FIG. 4 shows the interaction of the Persona Management Application 102 when establishing a new decentralized identity for a persona:
1. An application navigation interface 400 prompts a user to select a Persona that requires a decentralized identity.
2. The user then uses the Decentralized Identity Platform Selector function 402 to pick which blockchain will be used to anchor the decentralized identity. There are many identity focused blockchains currently available. The list of supported blockchains that the user may select from are uploaded from the Persona-Based Decentralized Identity Services Platform 110, as shown with arrow 404.
3. The Decentralized Identity Platform Selector informs the Decentralized Identity Wallet Manager 406 of the selected blockchain.
4. The Decentralized Identity Wallet Manager 406 creates a wallet 408 for the persona for that blockchain in wallet repository 410.
5. The Decentralized Identity Wallet Manager 406 creates a key pair for the persona.
6. The Decentralized Identity Wallet Manager 406 creates the principal DID for the persona.
7. The Decentralized Identity Wallet Manager 406 informs the Persona-Based Decentralized Identity Services Platform 110 of the Persona DID, as shown with arrow 412.

Figure 5:
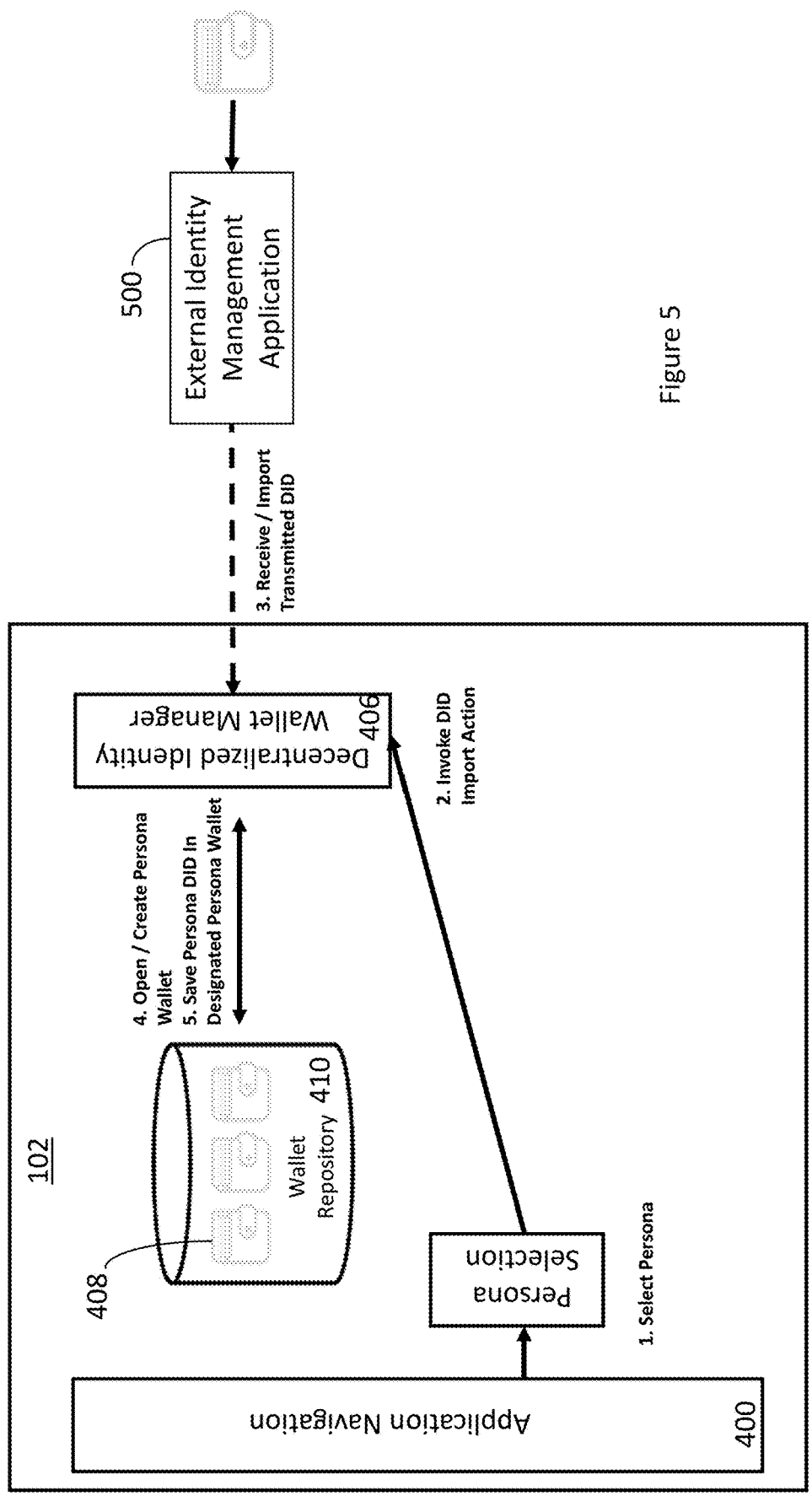
FIG. 5 illustrates operations performed by a digital wallet in accordance with an embodiment of the invention.

In another embodiment, an external DID-based identity is managed by an External Identity (DID) Management Application 500, as shown in FIG. 5. In this scenario, a user may want to export the identity DID from that external application and import it into the Persona Management Application 102 that manages multiple personas for the user. In this embodiment, the external application will export the identity DID. In another embodiment, a separate process can perform the export function by reading the external application's storage repository or backup files. Once the identity DID has been exported from the external app, it is imported into the Persona Management Application 102. To receive the imported data, the Decentralized Wallet Manager 406 will invoke the imported DID identity information process. Next, the Persona Management Application will enable the user to select the receiving persona (or alternatively create a new persona) and save the imported identity DID into the designated wallet 408 of the receiving persona.

Figure 6:
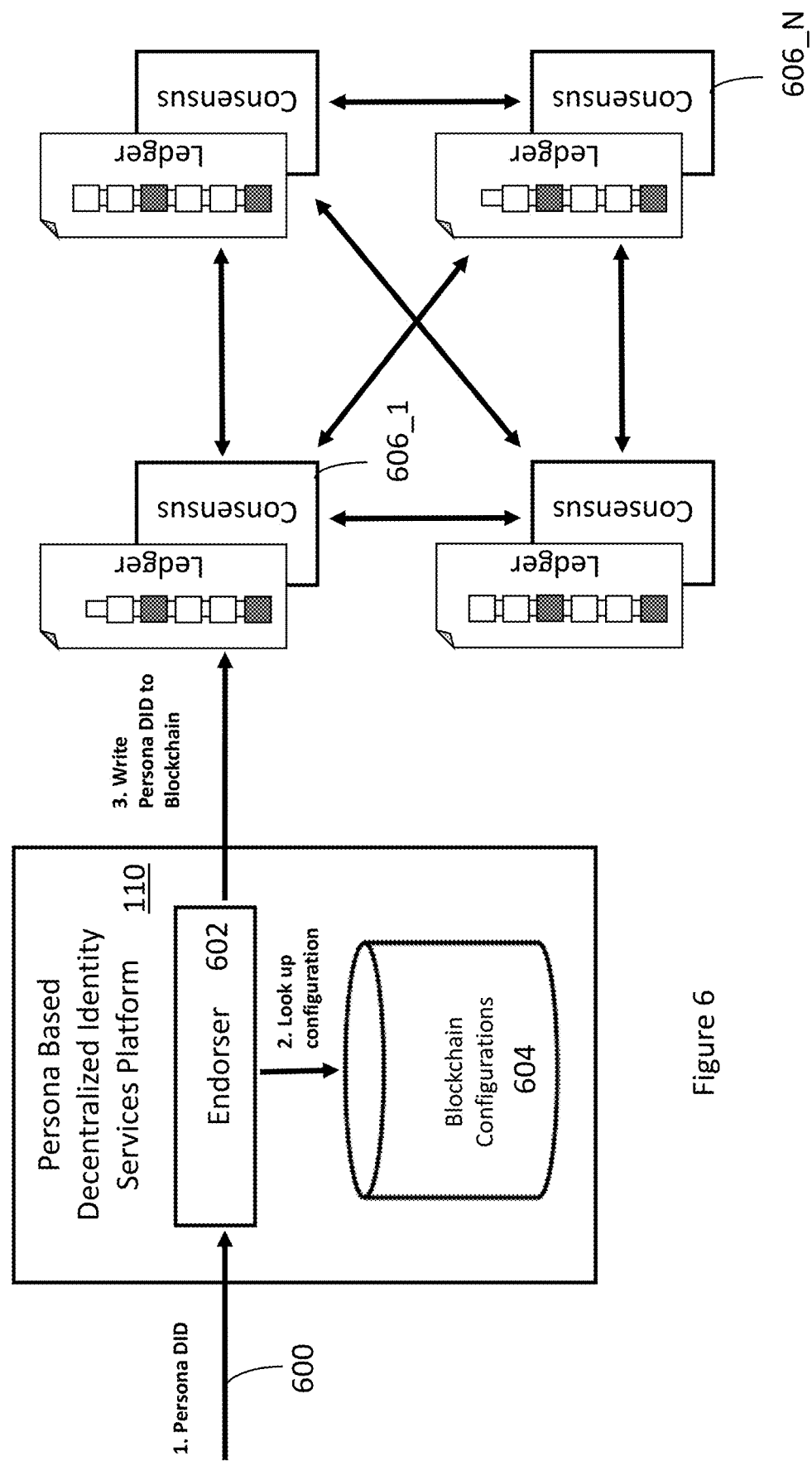
FIG. 6 illustrates platform interactions with a distributed ledger.

FIG. 6 continues the sequence and shows the interaction of the Personal Based Decentralized Identity Services Platform:
1. The Platform receives the Persona DID from the Persona Management Application, as shown with arrow 600. This DID contains all of the necessary information to enable writing of the DID to the correct blockchain (e.g., did:sov:identifier indicates the Sovrin blockchain).
2. The Platform's Endorser 602 is able to write to a number of different blockchains. In some cases the blockchains need to authorize the endorser (permissioned blockchains) and in other cases there is no authorization needed (permissionless blockchains). The supported blockchains are listed in the Blockchain Configuration database 604.
3. It then writes the Persona DID to the designated Blockchain. Writing the DID on the blockchain entails the activation of a consensus algorithm with multiple validator nodes 606_1 through 606_N (each with a copy of the ledger) contributing to the algorithm and confirming the data before writing to the blockchain.

Figure 7:
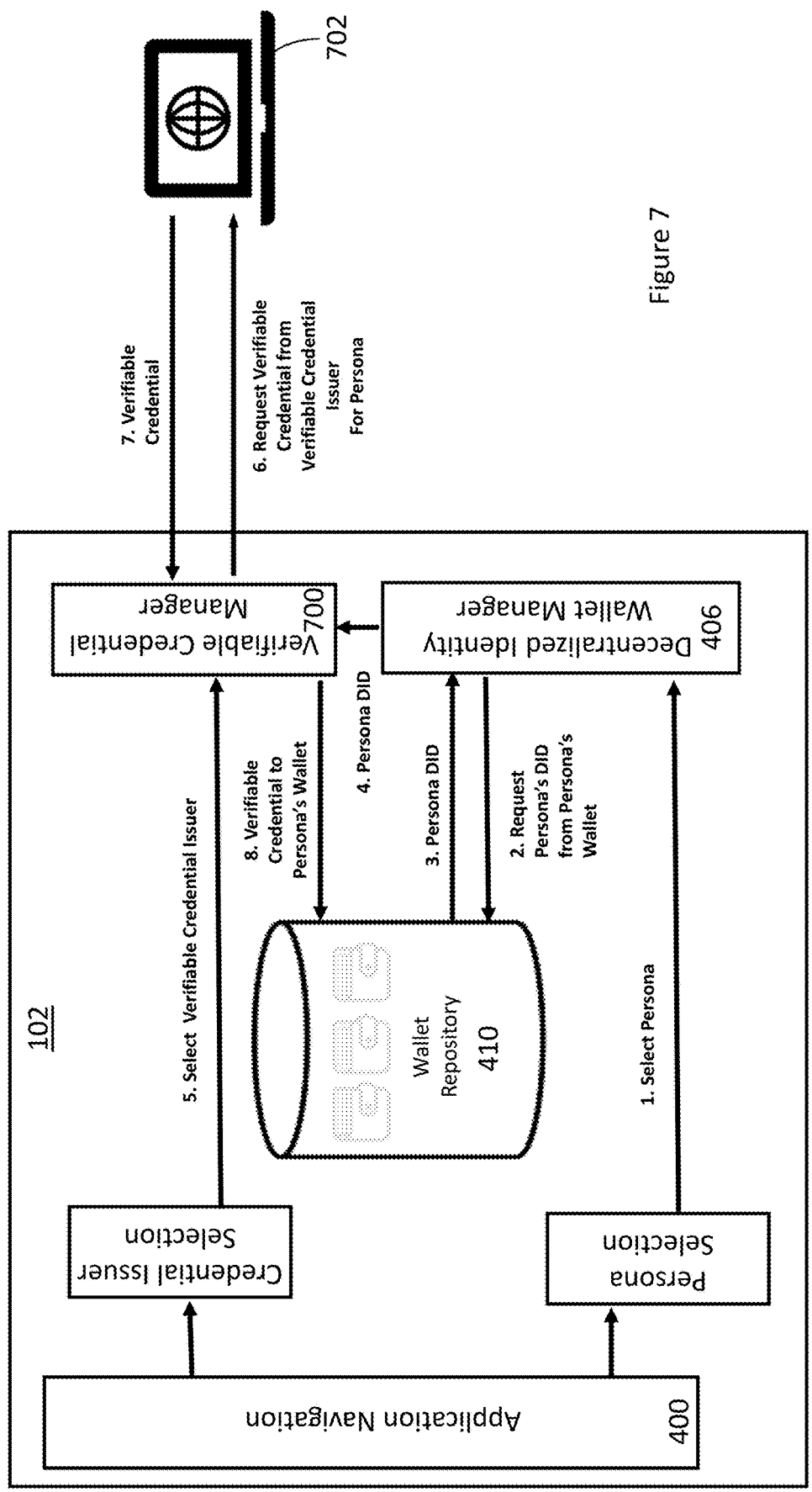
FIG. 7 illustrates operations to obtain a verifiable credential in accordance with an embodiment of the invention.

Verifiable Credentials are a key capability in the decentralized identity system. The idea is that a credential issuer will create a verifiable credential for a user, and that user can present that verifiable credential to credential validator. FIG. 7 shows how this is achieved using the persona-based identity model:
1. The application navigation module 400 prompts a user to select the persona that requires a verifiable credential.

2. The Decentralized Identity Wallet Manager 406 requests the Persona's DID from the Persona's decentralized identity wallet 410.
3. The Persona's DID is returned to the Decentralized Identity Wallet Manager 406.
4. The Persona's DID is passed to the Verifiable Credential Manager 700.
5. The application navigation module 400 prompts the user to select the Verifiable Credential Issuer.
6. The Verifiable Credential Manager 700 requests a verifiable credential from the Verifiable Credential Issuer 702 and includes the Persona's DID.
7. The Credential Issuer 702 returns a Verifiable Credential to the Verifiable Credential Manager 700. (This will involve validation of the Persona DID and other steps that are not included in this description.)
8. The Verifiable Credential Manager 700 writes the Verifiable Credential into the Persona's wallet 410.

Figure 8:
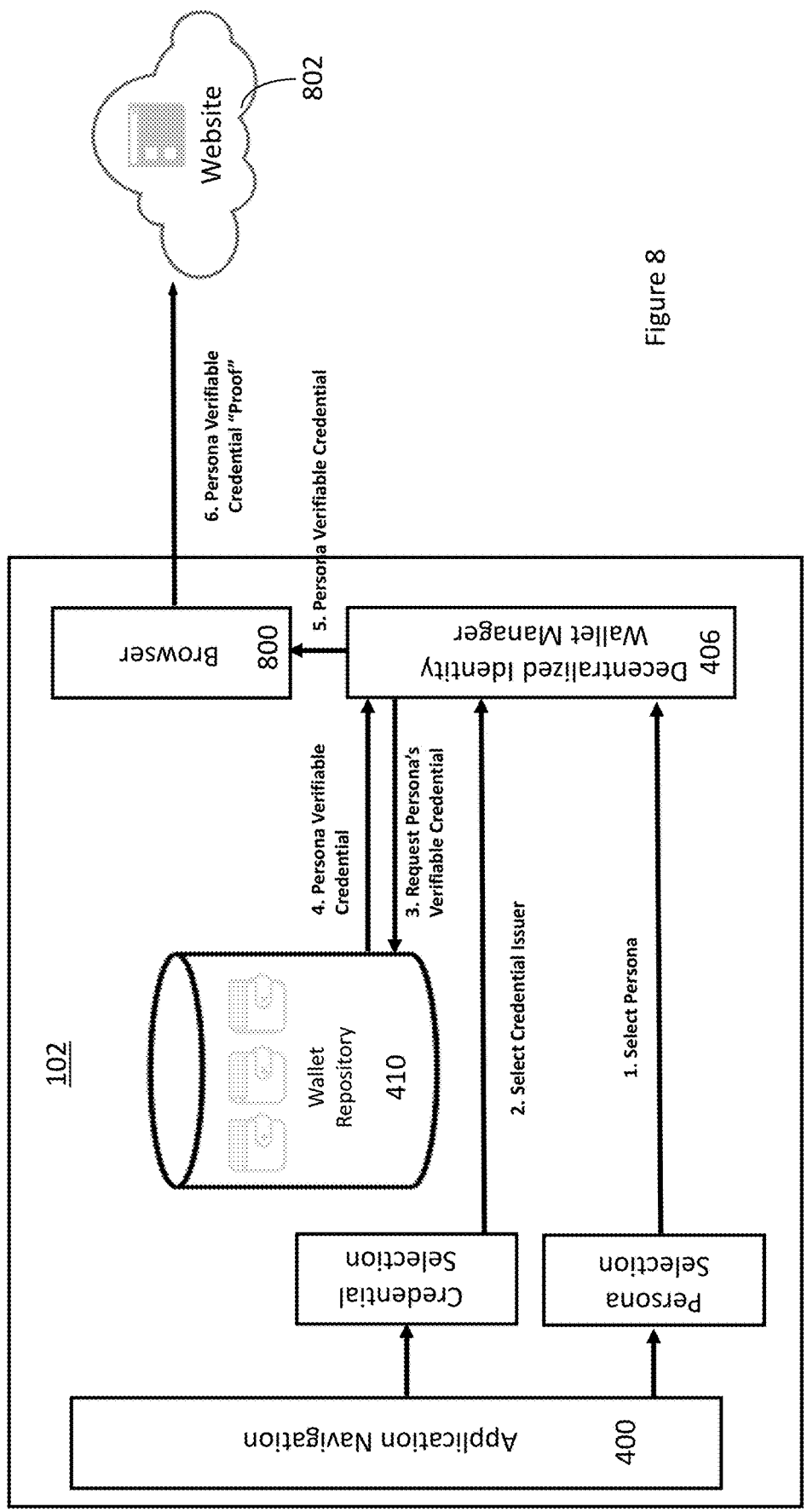
FIG. 8 illustrates operations to submit a verifiable credential in accordance with an embodiment of the invention.

Once a persona has been issued a verifiable credential it can then be used for transactions with services. In some cases, the claim from the verifiable credential will be presented, in other cases a Zero Knowledge Proof (ZKP; e.g., zk-SNARKs) will be involved that demonstrates a claim is true, without presenting the actual data behind the proof. FIG. 8 shows how this is achieved using the persona-based decentralized identity model:

1. The application navigation module 400 prompts a user to select a persona.
2. The application navigation module 400 prompts the user to select a Verifiable Credential Issuer (e.g., the transport department.).
3. The Decentralized Identity Wallet Manager 406 will use the persona and credential issuer information to request from the persona's wallet 410 the verifiable credential.
4. The Decentralized Identity Wallet Manager 406 receives the verifiable credential.
5. The Decentralized Identity Wallet Manager 406 passes the verifiable credential to the client component that will interface with the service. In the example, a browser 800 will be involved in presenting claims to a web site 802 for authentication.
6. The browser 800 presents the persona's Verifiable Credential (either claim or proof) to the web site 802 where it will be verified.

As described above, a single individual may create and employ multiple distinct digital identity personas. Each persona creates its own secure storage repository (e.g., "wallet") that enables it to create, store, negotiate, exchange, share, and/or otherwise employ many different digital identification or access control data elements. Such data elements may include decentralized identifiers (e.g., DIDs), public/private keypairs, secret keys, verifiable claims, computed (cryptographic) proofs, attestations, credentials, access control (login) credentials, cryptographic tokens, user identifiers, etc. These data elements may be used to perform a wide range of identification and/or access control functions, which may include, but are not limited to: creating identification identifiers, encryption/decryption, creating/verifying digital signatures, creating/verifying cryptographic proofs (e.g., zero knowledge proofs or other verification/validation operation), generating/storing digital tokens, and/or securely remitting/receiving any digital elements. Any of these data items may be stored and the processing functions may be performed in secure storage and computing hardware elements, main computer memory, digital storage elements, or even user-approved secure network-connected (e.g., cloud) processing and storage elements.

The initial purpose for users creating different digital personas is to separate respective activities in order to keep information related to those activities (plus any related metadata, tracking identifiers, etc.) separate from one another. This lets users perform different online activities that are not correlated with one another. However, in other use cases, it may be desirable to intentionally and selectively exchange or share information between two or more of a user's digital personas.

As an example, suppose that a user creates a first digital persona corresponding to a legal identity and receives a verifiable credential or token (e.g., digital driver's license) from a government's department of motor vehicles that authorizes the user to drive a motor vehicle. It is common practice that driver's licenses are used as common identification, since the issuing government establishes a common source of truth that is trusted by the nation's citizens and businesses. Next, suppose that the user creates a second digital persona in order to make purchases online and chooses to purchase an item monitored by the national government, such as crypto currency. When making such purchases, it is commonly required that the vendor (or broker) obtain the purchaser's official legal identity before selling to the user. In this instance, since the shopping persona is distinct from the legal identity persona, the respective digital wallets will also be distinct, and the shopping persona's wallet would not have the driver's license credential needed to make a controlled purchase of crypto currency. While keeping the persona wallets completely separate is the normal course of operations, in this instance, it may be desirable to share/delegate the driver's license verifiable credential (from the legal identity persona's wallet) with/to the shopping persona, so that it can provide the required credentials to the crypto currency vendor and complete the purchase transaction.

During some situations it will likely be necessary or desirable for user-created personas to collaborate with each other and share, exchange, convey, or perform collaborative computations on the digital elements contained in other wallets. In other situations, it may also be necessary or desirable for digital personas not owned or managed by the same user to similarly share credentials or other secure data items from their respective wallets. During these situations, it is necessary for a supervisory management process to establish user-selectable rules governing the sharing, access, or even blocking of credential access. This supervisory management process is referred to herein as the Identity Data Management Controller (IDMC).

FIG. 9 shows a collection of user-created personas 104_1 through 104_N together with associated Decentralized Identity Wallets 106_1 through 106_N. In this sample depiction, a user has created personas for Legal Identity, Work Identity, Social Media, Home Identity, and Shopping Identity activities. FIG. 9 also contains a sample screen whereby a user can create specific rules that will govern how secure wallet information may be shared with other user-controlled personas. In this illustration, a user may select the exchange settings (e.g., Accept, Share) for several example secure digital items (e.g., Connections, Verifiable Claims, Web Logins, Secret Values, etc.) for each of the various personas that they have created and/or manage.

In the example in FIG. 9, the Legal Identity Persona is configured to only share secure digital items with other personas. Additionally, the Legal Identity Persona is set to block the acceptance of inbound secure digital items from other personas. This keeps the Legal Persona as a source of legal credentials while still providing an allowable basis to other personas. Conversely, the Work Identity Persona is configured to accept shared credentials (e.g., from the Legal Identity Persona), but then not share its own credentials with other personas. This would let the Work Identity Persona use the owner's legal credentials to perform a requisite action (e.g., use the legal driver's license to rent a car) without sharing credentials from the employer with non-work personas.

Figure 10:
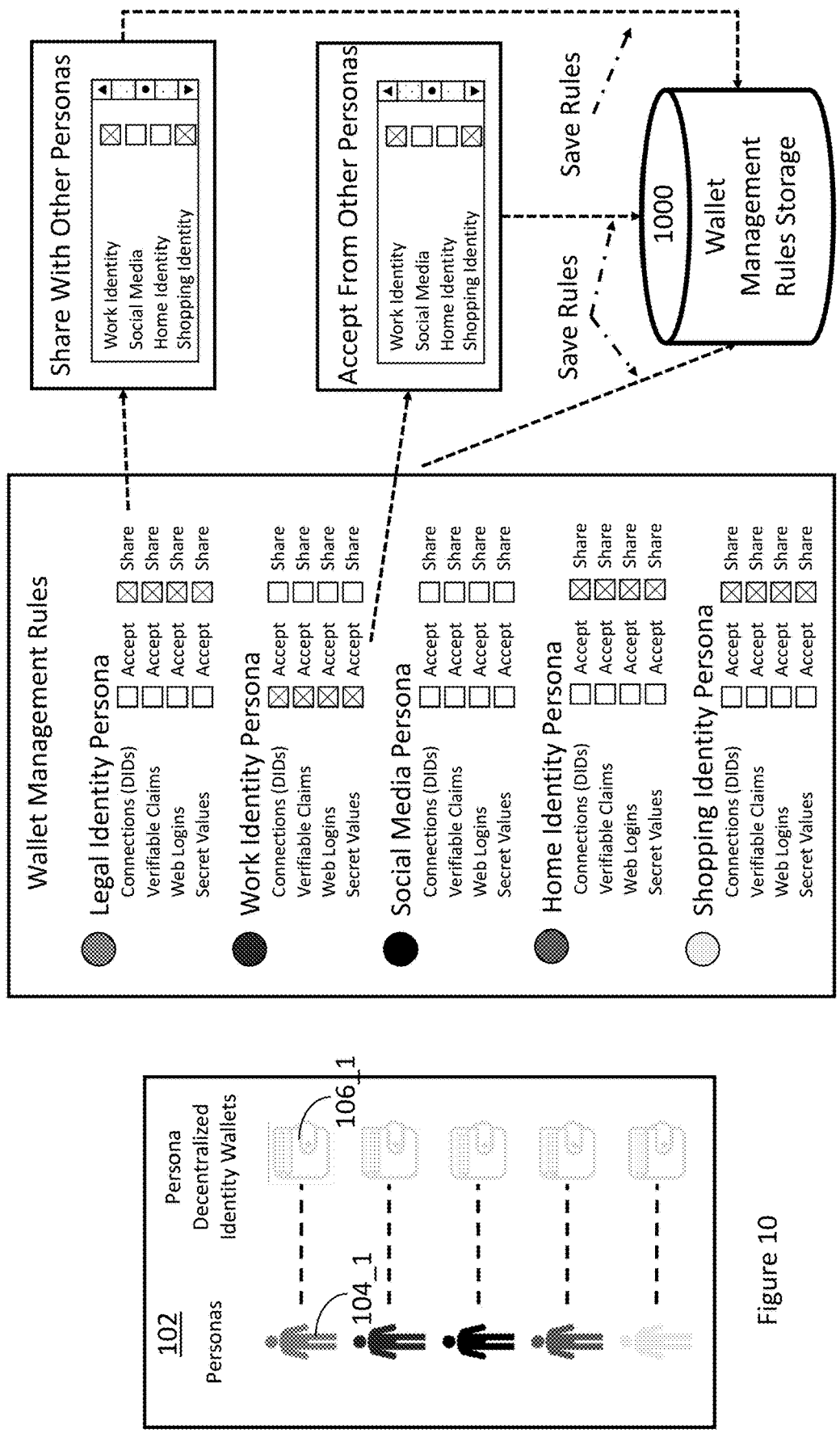
FIG. 10 illustrates management rules for different compartmentalized persona attributes.

In FIG. 10, the information from FIG. 9 is extended to further specify from whom and to whom secure digital items may be shared. For example, while the Legal Identity Persona's Wallet Management Rules are configured to allow "Share" operations, it may be desirable to only share them with certain personas while simultaneously disallowing them to be shared with other personas. As shown in FIG. 10, the Legal Identity Persona is configured to allow Connections (DIDs) sharing, but is restricted to only allow Connections (DIDs) to be shared with the Work Identity Persona and the Shopping Identity Persona, while remaining blocked from sharing Connections with any other persona. Such rules are specified in wallet management rules storage 1000.

By defining rules governing how secure digital items may be shared (or blocked from being shared), it allows the user to define how secure digital items may be shared during configuration (initial or subsequent) and reduces the possibility of inadvertently making a sharing mistake during application runtime operations. This enables higher level user applications to perform actions, such as automatic credential exchange, credential blocking, or credential action user prompting in order to simplify the required user interaction steps and thereby create a simpler, cleaner, and more pleasant application experience for users, while still keeping data secure.

Figure 11:
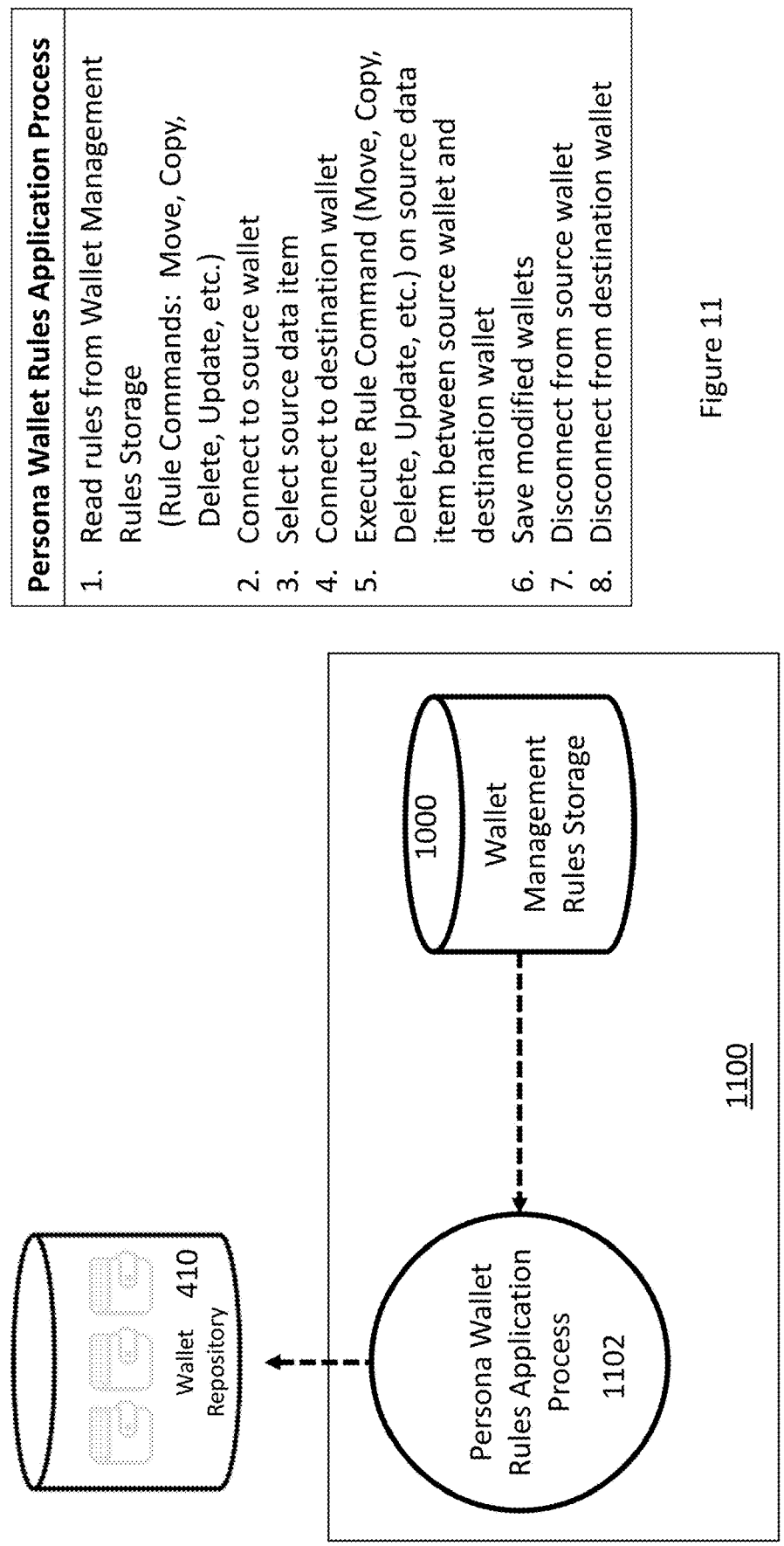
FIG. 11 illustrates digital wallet components utilized in accordance with an embodiment of the invention.

In FIG. 11, the key elements of an Identity Data Management Controller 1100 are depicted. In this diagram, a Wallet Repository 410 provides the secure storage environment for some or all of a user's identity persona wallets. A Wallet Management Rules Storage 1000 contains all of the Wallet Management Rules as described above. A Persona Wallet Rules Application Process 1102 continually monitors for changes made to the wallets in the Wallet Repository 410 and/or to the rules in the Wallet Management Rules Storage 1000. When the Persona Wallet Rules Application Process 1102 detects changes, it reapplies the rules associated with the new changes in order to keep the state of the wallets up to date and ready to service user request intereactions.

Figure 12:
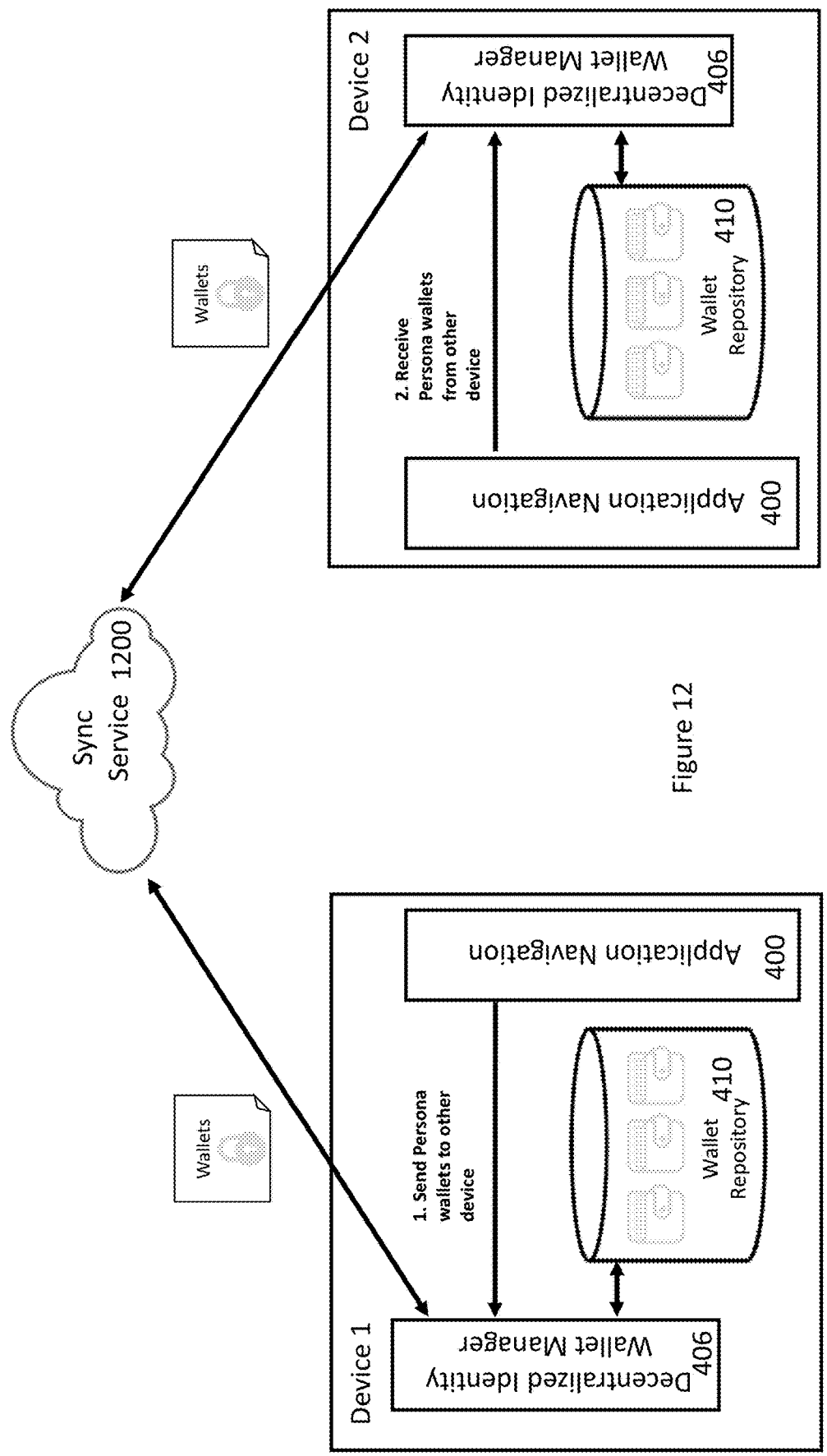
FIG. 12 illustrates synchronization operations performed in accordance with an embodiment of the invention.

Another important concept is that a user has access to persona decentralized identities across multiple devices (e.g., iPhone, iPad, Android phone, desktop). Everything important to the persona decentralized identity is stored in the persona wallet. FIG. 12 shows how a user might synchronize a persona wallet from one device to another. In the figure, a wallet on Device 1 has the persona wallets and they need to be added to Device 2.

1. The user instructs the Device 1 to securely transit the wallet(s) to Device 2. As part of this process Device 2 is identified to Device 1 (e.g., using a QR code, transmitted identifier, etc.), and a cryptographic key is generated to encrypt the wallets before sending.
2. The user also instructs Device 2 to receive the persona wallets. They are sent from Device 1 across the sync service 1200 to arrive at Device 2. At Device 2 they are unencrypted and stored.

While FIG. 12 depicts the "Sync Service" 1200 as a cloud-based service, alternative embodiments allow the wallet(s) to be transferred without using the cloud using a locally provided transmission method (e.g., WiFi, Bluetooth, IR, ultrasonic, etc.). Local transfer ensures that the transmitted wallets are never present in a cloud-based environment, which may archive or attempt to access the wallet transmissions.

Figure 13:
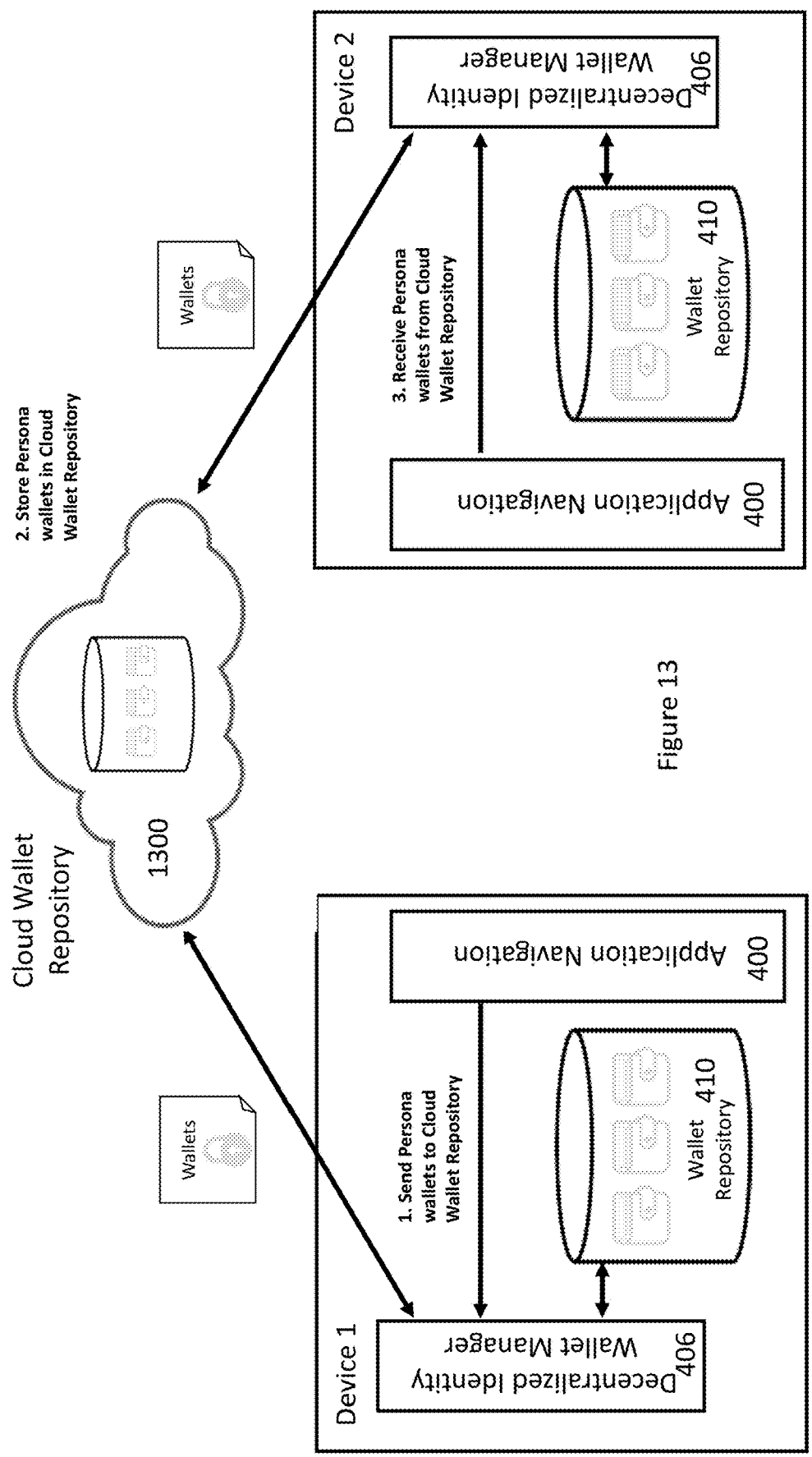
FIG. 13 illustrates synchronization operations performed in accordance with another embodiment of the invention.

An alternative model is shown in FIG. 13. In this model, the user's persona wallets are stored (backed up) in the cloud using a provider or external cloud backup service (e.g., iCloud) 1300. This provides the convenience of ensuring that the user's persona wallets are recoverable, even if the user loses all devices. The disadvantage is that this cloud storage becomes a target for an adversary to retrieve the user's persona wallets.

1. The user instructs the Device 1 to backup wallets to Cloud Wallet Repository 1300. As part of this process a cryptographic key is generated to encrypt the wallets before sending.
2. The Cloud Wallet Repository 1300 receives the encrypted wallets and stores them.
3. The user on Device 2 instructs the Cloud Wallet Repository 1300 to send the persona wallets. At Device 2 they are unencrypted and stored.

In some embodiments, it may be desirable to transfer a full Persona from one person to another person. In such scenarios, all necessary data related to the specific Persona will be transferred and can include information, such as: identity wallet, communication identifiers/contact points (e.g., email, phone, credit card, etc.), encryption keys, DIDs, etc.

Transferring a Persona from one person to another person may be done on a temporary basis. An example of a temporary transfer can occur when a manager or supervisor goes on vacation and delegates one or more work-related Personas to an administrative assistant. In this scenario, the manager transfers the Persona when the manager leaves on vacation and the administrative assistant transfers the Persona back to the manager when the manager returns to the office. In this way, the Persona can remain continuously active (e.g., to service customers) despite there being a change in which real-world person is actually in control of the Persona at a given time. The steps of the temporary transfer process are performed as described in FIGS. 12 and 13.

In another embodiment, the temporary Persona transfer can be made permanent. In this scenario, the Persona is transferred as described in the temporary Persona transfer process with the exception that it is never returned to the previous owner.

In another embodiment, a Persona may be permanently (or even temporarily) transferred in exchange for payment. In this scenario, an exchange of money or other remuneration is made in conjunction (before, during, or after) with the transfer process.

In another embodiment, a Persona may be co-owned or co-managed by two or more persons. In this scenario, the Persona may be transferred back and forth using the other embodiment processes described above. Alternatively, the Persona may be hosted or stored within one person's (or service's) device with protocol methods provided that enable the other authorized co-owner person(s) to remotely access the Persona data and identity information.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
    maintain a digital wallet with digital identities, wherein each digital identity has:
        identity attributes different than identity attributes associated with a real individual utilizing the digital identity,
        an associated attribute for compartmentalized network activity,
        a digital identity key pair, and
        a designated block chain; and
    support interactions between the digital identities of the digital wallet and a digital identity services platform.

2. The non-transitory computer readable storage medium of claim 1 wherein the digital wallet prompts the real individual to select a digital identity within the digital wallet.

3. The non-transitory computer readable storage medium of claim 1 wherein the digital identity services platform stores configuration information about the designated block chain.

4. The non-transitory computer readable storage medium of claim 1 wherein the digital identity services platform stores a reference to one or more block chains to be used by an endorser to write consensus computations.

5. The non-transitory computer readable storage medium of claim 1 wherein the digital wallet is configured to request a verifiable credential for a digital identity from a verifiable credential issuer.

6. The non-transitory computer readable storage medium of claim 1 wherein the digital wallet is configured to submit a verifiable credential proof for a digital identity.

7. The non-transitory computer readable storage medium of claim 1 wherein the associated attribute is selected from a legal identity persona, a work identity persona, a social media persona, a home identity persona and a shopping identity persona.

8. The non-transitory computer readable storage medium of claim 1 wherein each associated attribute has configurable rules specifying permissible digital information that may be shared with others.

9. The non-transitory computer readable storage medium of claim 1 wherein the digital wallet is configured to synchronize information on multiple devices controlled by the real individual.

10. The non-transitory computer readable storage medium of claim 1 wherein the digital wallet is configured to transfer a digital identity from the real individual to another individual designated by the real individual.

11. The non-transitory computer readable storage medium of claim 1 wherein the digital wallet is configured to share control of a digital identity between the real individual and another individual.

* * * * *